Feb. 9, 1943.    A. B. DETTMER    2,310,353
REAR VIEW MIRROR AND BRACKET
Filed Feb. 27, 1941
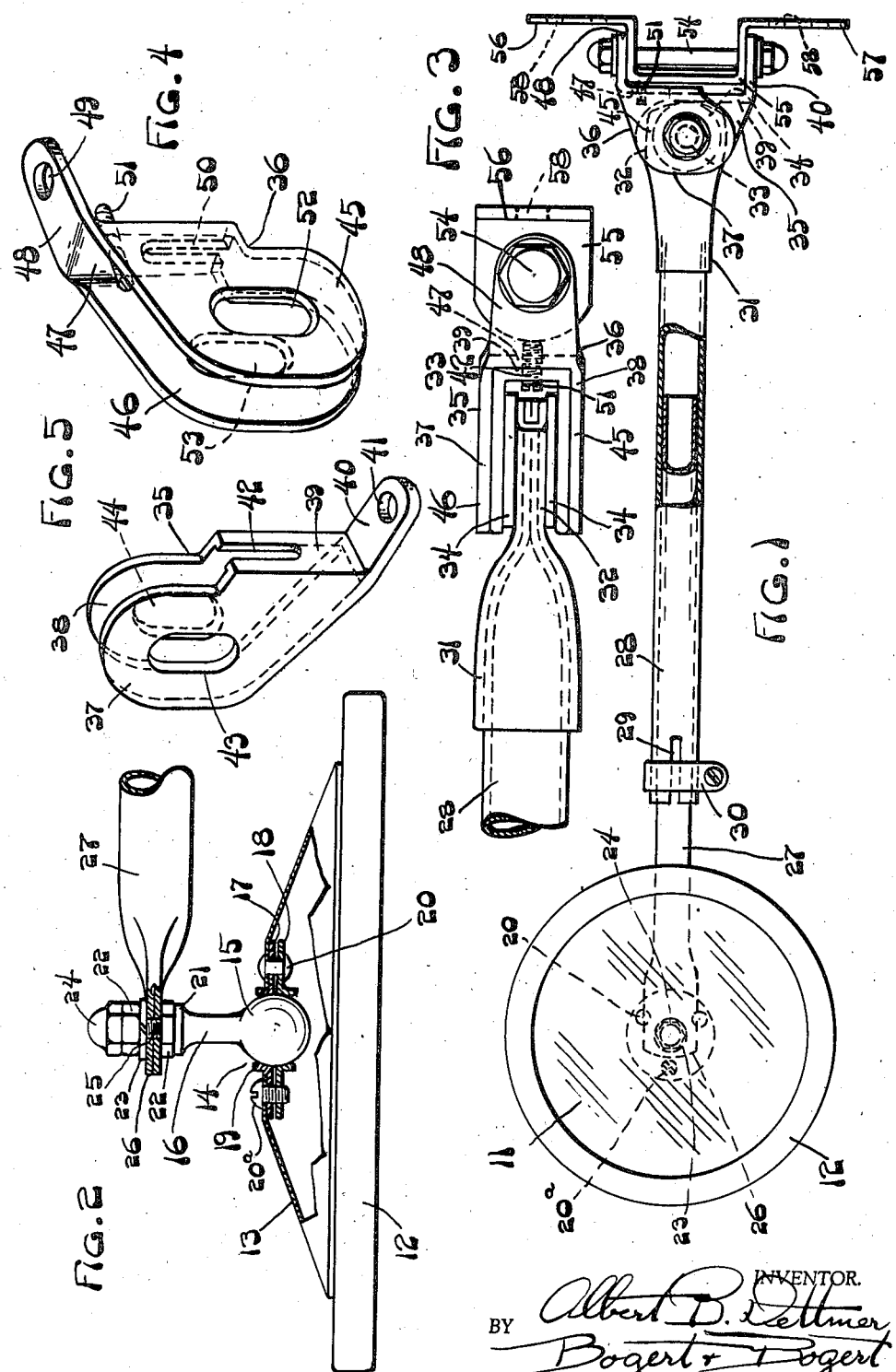
INVENTOR.
Albert B. Dettmer
BY Bogert & Bogert
ATTORNEYS Patented Feb. 9, 1943

2,310,353

UNITED STATES PATENT OFFICE 2,310,353

REAR VIEW MIRROR AND BRACKET

Albert B. Dettmer, Cincinnati, Ohio, assignor to The K-D Lamp Company, Cincinnati, Ohio, a corporation of Ohio Application February 27, 1941, Serial No. 380,781

2 Claims. (Cl. 248—289)

The invention described herein is designed for use primarily as an accessory for motor vehicles and particularly for that type of motor vehicle commonly known as a commercial type, such as exemplified by trucks, buses and the like in which a large body frequently renders vision to the rear of the vehicle very difficult in observing the movements of vehicles to the rear and in observing the presence of vehicles, obstructions, persons and the like in conducting any backing movement of the vehicle.

An object of the invention is to produce such a rear vision mirror bracket as is both rigid and strong, of light weight and readily adjustable, and which is capable of being mounted by any one having but slight skill in the use of simple tools.

These and other objects are attained in the rear view mirror bracket described in the following specification and illustrated in the accompanying drawing, in which:

Fig. 1 is a rear elevation, such as would be seen by the driver of a vehicle equipped with my improved construction, in reduced scale and showing details broken away for purposes of illustration.

Fig. 2 is an enlarged view, taken edgewise, showing the mirror and the means by which it is mounted adjustably, parts being broken away for purposes of illustration.

Fig. 3 is an enlarged fragmental plan view of the bracket at and in the region of its mounting element.

Figs. 4 and 5 are perspective views of the complementary portions of the mounting element.

The rear view mirror and bracket shown in its entirety in Fig. 1, is equipped, preferably, with a mirror of the general type shown, in which the glass 11 is bounded by a frame 12, with a raised back 13, shown in Fig. 2 which contains a simple and effective ball and socket adjustment joint 14. The ball 15 of the joint 14 is provided with a stem 16, while the backing 13, which has a central opening, is provided on its under face with two plates in the form of two washers 17 and 18, which are identical. Each washer has an opening flange 19 which is slightly smaller in opening than the diameter of ball 15, and the two washers are secured to the backing 13 by rivets 20 located to one side of the center as shown, the opposite side of each of the two washers being free to spring apart in easy gripping friction upon the ball 15, thereby constituting a socket for it. Centrally of the spring portions of the washers 17 and 18 a screw 20a or other tightening means in washer 18, is provided to draw the backing 13 and washers 17 and 18 into a clamping grip upon the ball 15, whereby the mirror will remain fixed relatively to its mounting ball.

Stem 16 of the ball is shouldered, as at 21, so that with nuts 22, a lock washer 23, and a cap nut 24 on the screw threaded portion 25 of the ball stem, the ball may be fixed on the flattened end 26 of the tubular arm extension 27 of the bracket which I will now describe.

The extension 27 of the bracket telescopes within a tubular arm 28 of the bracket, which is split at its end as at 29, and which is provided with a clamp 30, whereby adjustment and gripping of arm 28 on extension 27 is made possible to secure the bracket fixed in adjusted position. The opposite end of arm 28 is provided with a reenforcement sleeve 31 which, together with the walls of the arm, is flattened to provide a heavy pivot lug 32 through which an opening is made for the reception of a tightening bolt 33. On each side of the lug 32 I provide washers 34, preferably of fibre or other material equally adaptable to produce a friction joint at this point whereby adjusted positions may be retained. The assembly of arm lug 32 and washers 34 is located within a clamping structure which I shall now describe.

This clamp consists primarily of two elements, namely an inner jaw member 35, shown in Fig. 5, and an outer jaw member 36, shown in Fig. 4. These two members are identical except that the inner jaw fits within the outer jaw, as shown in Figs. 1 and 3. Otherwise they possess the same dimensions and are complementary to each other to produce a set of clamp jaws which will function as will be described. Jaw 35 has two ears 37 and 38 which lie in spaced and parallel relationship as shown, so as to receive the lug 32 and washers 34 between them. The separating web 39 of the jaw has a mounting lug 40 provided thereon at a right angle thereto, with a bolt-receiving aperture 41 in the lug, and an open-ended slot 42 in web 39. In the ears 37 and 38 I provide slightly elongated openings 43 and 44 for a bolt which will cause the clamp to function. Jaw 36 likewise has two ears 45 and 46 which are spaced apart in parallel relationship to take the ears 37 and 38 of the jaw 35 between them, the web 47 of jaw 36 having a lug 48 at a right angle thereto, with a bolt-receiving aperture 49 in the lug and an open-ended slot 50 in the web 47. Additionally to these details, web 47 is provided with a set screw 51, the purpose of which will be described, while elongated bolt apertures 52 and 53 are provided for cooperation with apertures 43 and 44 of jaw 35 in the clamping operation.

When the clamp jaws, the friction washers, and lug 32 are assembled by the bolt 33, the lugs 40 and 48 are aligned for reception of a mounting bolt 54. This bolt clamps the jaws together upon a bracket plate 55 which has its ends 56 and 57 provided with openings 58 for screws or bolts which pass into the vehicle body for attaching purposes. The object of the relatively movable jaws, which elongated bolt apertures 43, 44, 52 and 53 indicate, is to permit of adjustability of lugs 40 and 48 and thereby to become clamped upon the hinge lugs of a vehicle door, wherein the hinge pin would be the bolt 54. Both as to the mounting of the bracket clamp on the plate 55 as well as on a vehicle door hinge, the set screw 51 has been provided for setting the angular position of the bracket so that no swinging movement thereof or slippage from angular placement in a horizontal plane from the vehicle body can take place. As to angularity of adjustment in the horizontal plane, the bolt 33 functions to secure the clamp jaw ears in tight gripping relationship on the friction washers and the arm lug 32, such a gripping function taking place because the slots 42 and 50 permit of the ears being drawn tightly as described. Obviously, clamp 30 secures the arm extension 27 in adjusted position, while screw 20a obtains the clamping action of socket washers 17 and 18 on the ball 15, thereby obtaining adjustment of mirror 11 in any of the infinite number of positions rendered possible by its universally movable mounting.

Having thus described my invention, what I claim is:

1. In a bracket for rear view mirrors, an arm, and a clamp at the vehicle-mounted end of the arm, said clamp comprising two telescoping members of substantially identical form, each comprising a structure of two-eared construction having a lug at the juncture of the ears, one of said members occupying a position with its ears between the ears of the other member and with the lugs of the members occupying opposed positions, and means to clamp said ears of the telescoped members upon the arm, whereby positions of adjustment of the arm and clamp members will be fixed and whereby positions of adjustment of the clamp member lugs will be fixed relatively to a vehicle body mounting element located between them.

2. In a bracket for rear view mirrors, an arm, and a clamp at the vehicle-mounted end of the arm, said clamp comprising two substantially U-shaped members of substantially identical form, each having a mounting lug extending from one end of the base of the U-shaped members and extending at an angle normal to the base and ears of the U-shaped members, said members occupying substantially telescoping relationship with the ears and bases overlapping each other, with the arm end between the ears, and with the lugs extending from opposite ends of the assembled members, and a clamping bolt extending through the ears and arm, whereby positions of adjustment of the lugs of the members may be fixed for purposes of mounting the bracket and simultaneously for placement of the mirror most advantageously for use.

ALBERT B. DETTMER.